(12) United States Patent
Fujita et al.

(10) Patent No.: US 8,916,995 B2
(45) Date of Patent: Dec. 23, 2014

(54) METHOD AND APPARATUS FOR SWITCHING ELECTRICAL POWER

(75) Inventors: Lincoln Mamoru Fujita, Roanoke, VA (US); Kanakasabapathi Subramanian, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 12/629,309

(22) Filed: Dec. 2, 2009

(65) Prior Publication Data
US 2011/0127853 A1    Jun. 2, 2011

(51) Int. Cl.
*H02H 3/00* (2006.01)
*G01D 4/00* (2006.01)
*H01H 1/00* (2006.01)
*H01H 59/00* (2006.01)

(52) U.S. Cl.
CPC .............. *G01D 4/004* (2013.01); *Y02B 90/242* (2013.01); *Y02B 90/244* (2013.01); *Y04S 20/322* (2013.01); *Y04S 20/327* (2013.01); *H01H 1/0036* (2013.01); *H01H 59/0009* (2013.01)
USPC .......................................... 307/131; 307/126

(58) Field of Classification Search
CPC ...................................................... H02J 9/005
USPC ................................................. 307/126, 131
See application file for complete search history.

(56) References Cited

U.S. PATENT DOCUMENTS

| | | | | |
|---|---|---|---|---|
| 5,767,790 A * | 6/1998 | Jovellana | ................. | 340/870.02 |
| 7,332,835 B1 * | 2/2008 | Wright et al. | ................. | 307/134 |
| 7,473,859 B2 * | 1/2009 | Wright et al. | ................. | 200/181 |
| 7,542,250 B2 | 6/2009 | Premerlani et al. | | |
| 8,624,430 B2 * | 1/2014 | Watson et al. | ................. | 307/31 |
| 2006/0274470 A1 | 12/2006 | Srinivasan et al. | | |
| 2007/0139145 A1 | 6/2007 | Subramanian et al. | | |
| 2007/0139829 A1 | 6/2007 | Arthur et al. | | |
| 2007/0139830 A1 | 6/2007 | Premerlani et al. | | |
| 2007/0139831 A1 | 6/2007 | Wright et al. | | |
| 2008/0106147 A1* | 5/2008 | Caggiano et al. | ............... | 307/39 |
| 2008/0137238 A1 | 6/2008 | Wright et al. | | |
| 2008/0165457 A1* | 7/2008 | Premerlani et al. | ............. | 361/31 |

(Continued)

FOREIGN PATENT DOCUMENTS

| | | | |
|---|---|---|---|
| JP | 2003503816 A | 1/2003 |
| JP | 2006250806 A | 9/2006 |
| JP | 2008192597 A | 8/2008 |

OTHER PUBLICATIONS

European search report issued in connection with EP Application No. 10193206.9 dated Mar. 25, 2014.

(Continued)

*Primary Examiner* — Jared Fureman
*Assistant Examiner* — Alfonso Perez Borroto
(74) *Attorney, Agent, or Firm* — Armstrong Teasdale LLP

(57) ABSTRACT

A current control device is described. The current control device includes at least one line socket configured to couple to a first power system. The current control device also includes at least one load socket configured to couple to a second power system and at least one micro-electromechanical system (MEMS) switching device coupled between the at least one line socket and the at least one load socket. The at least one MEMS switching device is configured to selectably couple the first power system to the second power system.

18 Claims, 4 Drawing Sheets

(56) References Cited

U.S. PATENT DOCUMENTS

| | | |
|---|---|---|
| 2008/0309438 A1 | 12/2008 | Caggiano et al. |
| 2008/0310058 A1* | 12/2008 | Premerlani et al. ............. 361/42 |
| 2008/0315980 A1* | 12/2008 | Premerlani et al. ............. 335/18 |
| 2008/0316664 A1* | 12/2008 | Premerlani et al. ............. 361/87 |
| 2009/0021879 A1* | 1/2009 | Rivers et al. ................. 361/93.2 |
| 2009/0289507 A1* | 11/2009 | Shiu .............................. 307/131 |
| 2009/0295233 A1* | 12/2009 | McGinley et al. ............ 307/126 |
| 2009/0322159 A1* | 12/2009 | Dubose et al. ................ 307/117 |
| 2010/0007522 A1* | 1/2010 | Morris ..................... 340/870.02 |
| 2010/0023095 A1* | 1/2010 | Stevenson et al. .............. 607/63 |
| 2010/0327801 A1* | 12/2010 | Morris et al. ................. 320/108 |

OTHER PUBLICATIONS

JPO Office Action for related matter 2010-268225 dated Jul. 1, 2014, 4 pp.

* cited by examiner

METHOD AND APPARATUS FOR SWITCHING ELECTRICAL POWER

BACKGROUND OF THE INVENTION

The present application relates generally to electric utility meters and, more particularly, to methods and apparatus for use in switching electrical power.

Electric utility companies provide electricity to both residential and commercial customers. To monitor an electricity usage of customers, electric utility companies often install one or more electricity meters on customers' premises. Such electricity meters often measure an amount of current and/or power provided to the customer, and recently started to include a switch mechanism that enables power distribution to the customer to be terminated or commenced as needed. Electricity meters often must conform to one or more industry standards, such as those set forth by the American National Standards Institute (ANSI). Such standards may impose restrictions upon utility meter design, such as required dimensions for a utility meter housing and/or an amount of current and/or voltage that a utility meter must be able to measure and withstand.

Most current meter implementations do not include a mechanism for an electric utility company to terminate or commence power distribution to a customer. Such a meter requires a technician to visit the customer premises and to physically remove or connect the meter to terminate or to commence power distribution as applicable. Such on-site visits may be costly and/or take a significant amount of time and/or money. Other known meters include a mechanism that enables an electric utility company to remotely terminate or commence power distribution to a customer. Such meters generally include a mechanical switch that requires a two-way communication device and a complex triggering mechanism to switch from a conducting to a non-conducting state.

At least some known residential, commercial and/or industrial electricity meters only operate on poly-phase power generated by electric utility companies. Because of industry standards and power requirements of such facilities, electricity meters may be unable to include a mechanical switch within its enclosure that enables the electric utility company to switch from a conducting to a non-conducting state. Other known electricity meters use solid state electronic switches to remotely connect and disconnect a customer's premises to and from the electric utility company's power distribution system, or grid. However, while in an "off" state, traditional solid state switches may exhibit a leakage current and have subsequent power losses. While in an "on" state, the same switches may exhibit additional power losses because of an on-state voltage drop across the solid state switch. Because of these power losses, traditional solid state switches may cause an undesirable buildup of heat within known electricity meters. Moreover, at least some known electricity meters are unable to reduce or eliminate fault currents that may flow through the meter.

BRIEF DESCRIPTION OF THE INVENTION

In one embodiment, a current control device is provided. The current control device includes at least one line socket configured to couple to a first power system and at least one load socket configured to couple to a second power system. The current control device also includes at least one micro-electromechanical system (MEMS) switching device coupled between the at least one line socket and the at least one load socket, the at least one MEMS switching device configured to selectably couple the first power system to the second power system.

In another embodiment, a utility meter is provided. The utility meter includes a line electrical bus configured to couple to a first power system and a load electrical bus configured to couple to a second power system. The utility meter also includes a current control device that includes at least one line socket configured to couple to the line electrical bus and at least one load socket configured to couple to the load electrical bus. The current control device also includes at least one micro-electromechanical system (MEMS) switching device coupled between the at least one line socket and the at least one load socket, the at least one MEMS switching device configured to selectably couple the first power system to the second power system.

In another embodiment, a current control device is provided. The current control device includes at least one line socket configured to couple to an electric utility power distribution system and at least one load socket configured to couple to a customer power distribution system. The current control device also includes at least one micro-electromechanical system (MEMS) switching device coupled between the at least one line socket and the at least one load socket, the at least one MEMS switching device configured to selectably couple the electric utility power distribution system to the customer power distribution system.

DETAILED DESCRIPTION OF THE INVENTION

Figure 1:
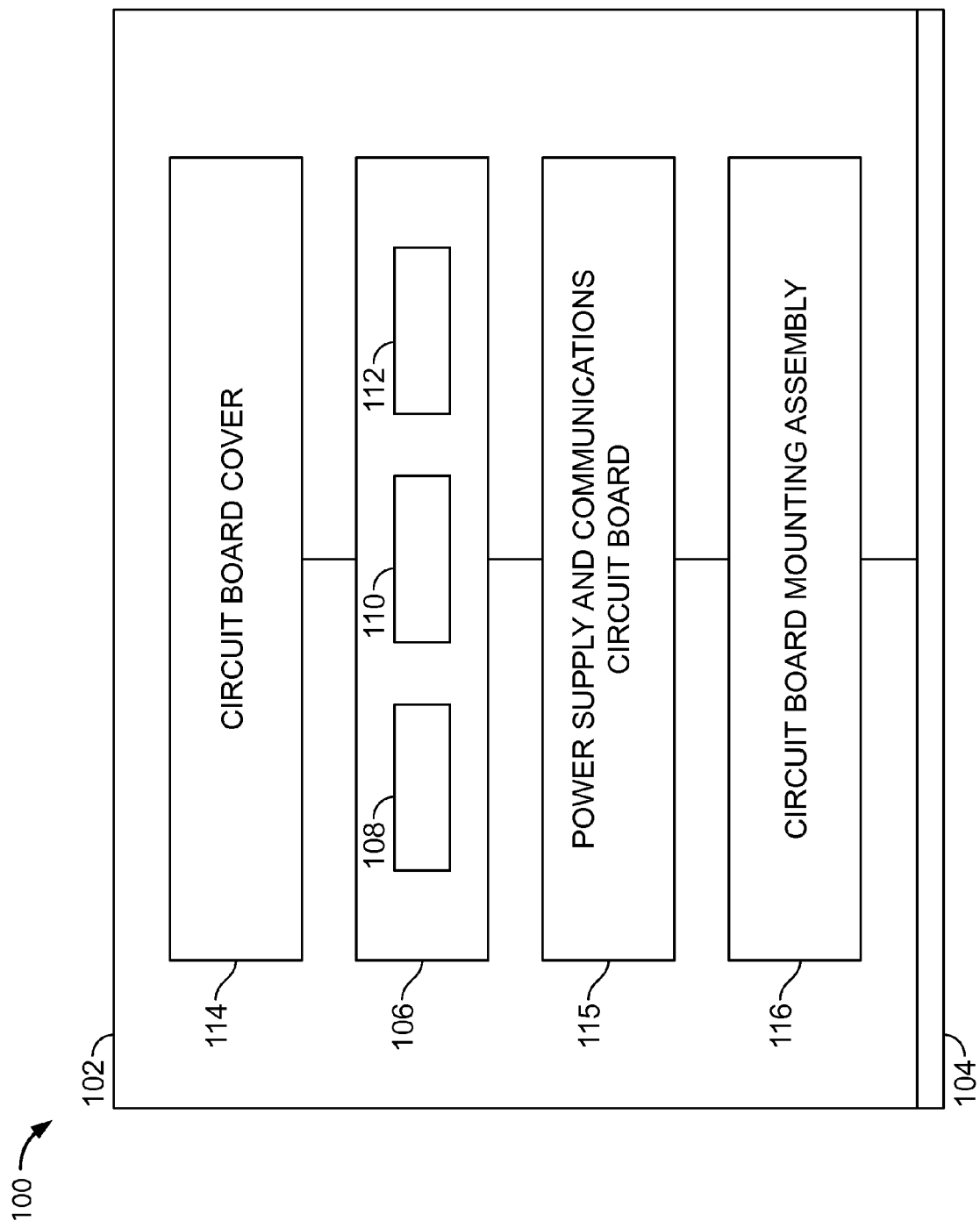
FIG. 1 is a block diagram of an exemplary electricity meter.

FIG. 1 illustrates a block diagram of an exemplary electricity meter 100. Electricity meter 100 is a single-phase, two-pole electricity meter that conforms to American National Standards Institute (ANSI) Form 2S requirements. Electricity meter 100 is removably inserted into a meter socket (not shown) to receive single-phase alternating current (AC) power from a utility company. Electricity meter 100 includes a top enclosure 102 and a bottom enclosure 104 that couple together. When coupled together, top and bottom enclosures 102 and 104 enclose a controller circuit board 106. A display 108, a microprocessor 110, and a memory 112, for example, are coupled to controller circuit board 106. Microprocessor 110 is communicatively coupled to display 108 and to memory 112. Controller circuit board 106 is coupled between a circuit board cover 114, a power supply and communications circuit board 115, and a circuit board mounting assembly 116. Circuit board mounting assembly 116 couples controller circuit board 106 and communications circuit board 115 to bottom enclosure 104 and to a plurality of meter components that are coupled to bottom enclosure 104.

Figure 2:
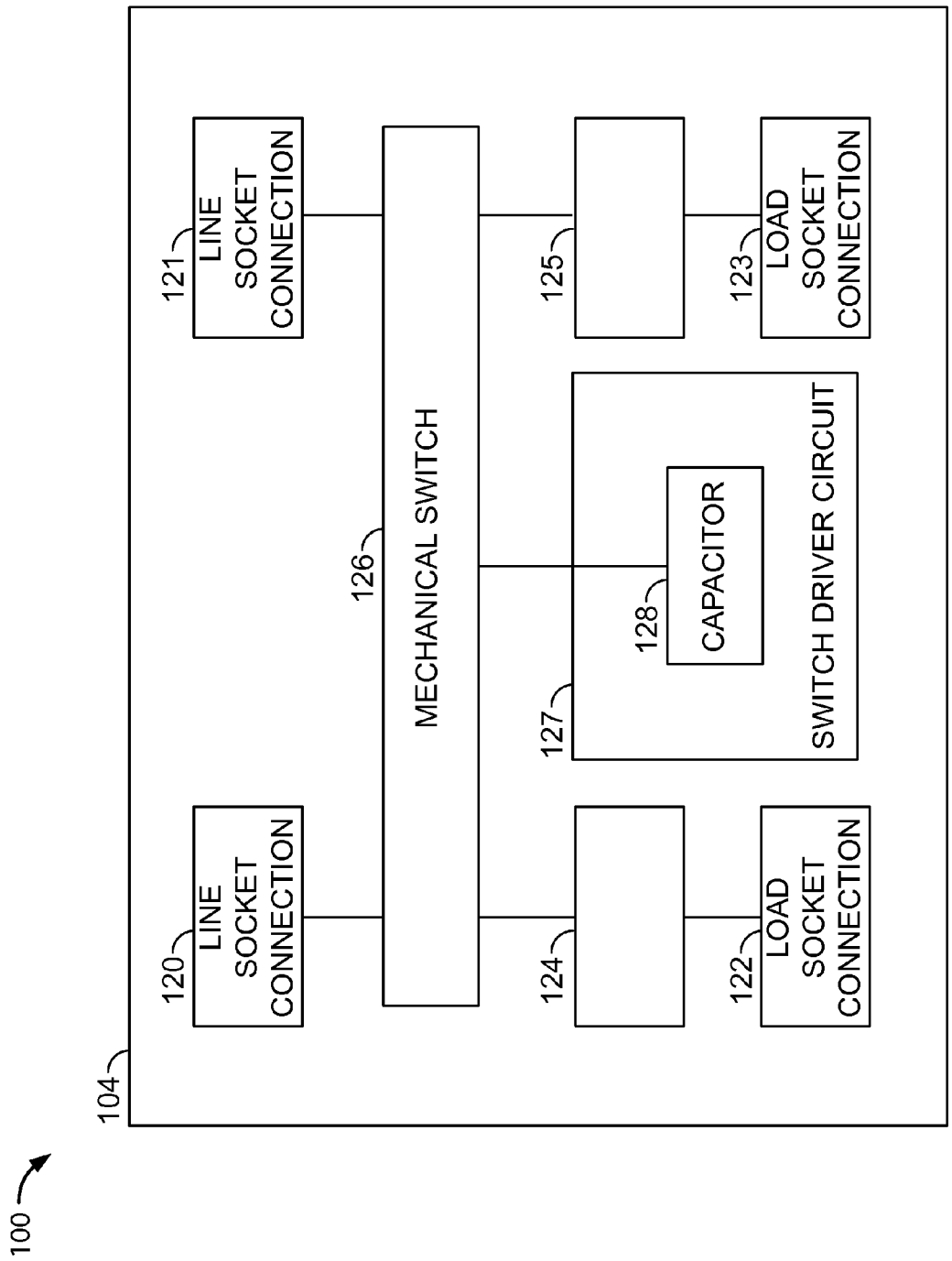
FIG. 2 is a block diagram of a portion of the meter shown in FIG. 1.

FIG. 2 illustrates an interior view of a portion of electricity meter 100. More specifically, a plurality of meter components is housed within bottom enclosure 104. For example, bottom enclosure 104 includes a first phase line socket connection 120 and a second phase line socket connection 121 for receiving line power connections (not shown) from the meter socket, and a first phase load socket connection 122 and a second phase load socket connection 123 for receiving load power connections (not shown) from the meter socket. Power received through first and second phase line socket connections 120 and 121 is transmitted to a first phase line current transformer 124 and a second phase line current transformer 125. First and second phase line current transformers 124 and 125 measure an amount of current received from the load power connections and transmit one or more measurements to microprocessor 110 (shown in FIG. 1). A two-pole single-phase mechanical switch 126 couples a line electrical bus (not shown in FIG. 2) to a load electrical bus (not shown in FIG. 2). Moreover, in the exemplary embodiment, a switch driver circuit 127 is coupled to microprocessor 110, to a capacitor 128, and to switch 126. Microprocessor 110 controls an opening and a closing of switch 126 via switch driver circuit 127 and capacitor 128. More specifically, microprocessor 110 commands switch driver circuit 127 to open and/or to close switch 126. In response, switch driver circuit 127 uses energy stored in capacitor 128 to open and/or to close switch 126. One or more metal oxide varistors (MOVs) (not shown) facilitate protecting electricity meter 100 from transient voltage surges. MOVs are positioned beneath switch 126 and current transformers 124 and 125.

Figure 3:
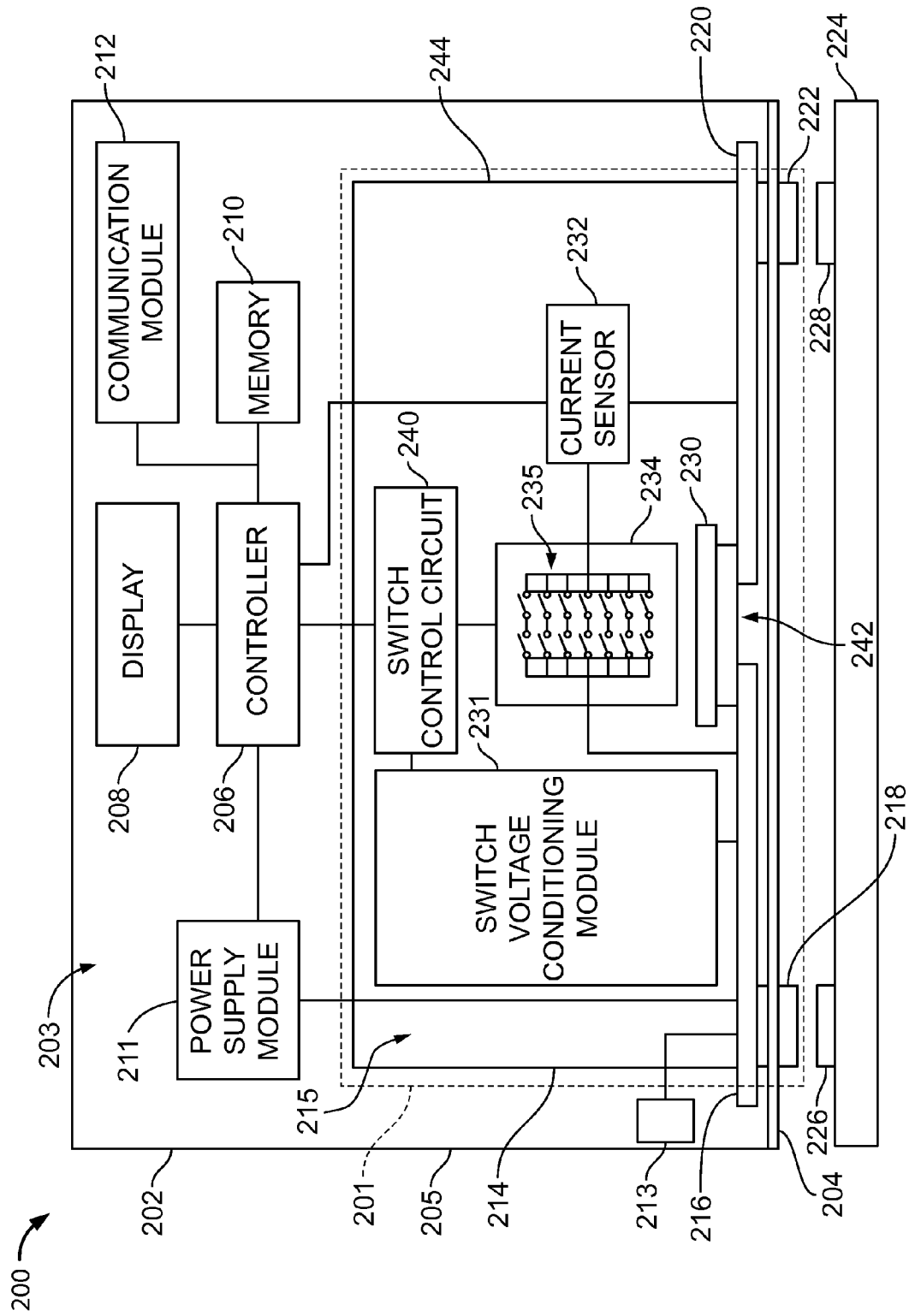
FIG. 3 is a block diagram of a portion of an exemplary single-phase electricity meter.

FIG. 3 is a block diagram of a side view of an exemplary electricity meter 200 that includes at least one pole 201. In one embodiment, meter 200 is a one-pole single-phase meter that conforms to ANSI form 1S requirements. In the exemplary embodiment, meter 200 is a two-pole single-phase meter that conforms to ANSI form 2S requirements. FIG. 3 illustrates, for clarity, only a single pole 201 within meter 200. In the exemplary embodiment, meter 200 includes two poles 201, with a pair of substantially similar poles. Meter 200 includes an upper enclosure 202 that couples to a lower enclosure 204. When coupled together, upper enclosure 202 and lower enclosure 204 form a substantially sealed housing 205 that houses a plurality of meter components 203 therein. In the exemplary embodiment, housing 205 houses meter components 203, such as a controller 206, a display 208, a memory 210, a power supply module 211, a communication module 212, a voltage transient suppressor 213, a micro-electromechanical system (MEMS) switch assembly 214, a line bus 216, and a load bus 220. Lower enclosure 204 includes a meter line connection 218 and a meter load connection 222 that couple to a respective socket line connection 226 and to a socket load connection 228 of a meter socket 224. When meter 200 is operatively coupled to meter socket 224, meter 200 receives current from an electrical source, such as an electric utility distribution grid (not shown). Current flows from meter socket 224 through socket line connection 226 to meter line connection 218 and to line bus 216. Current is directed through MEMS switch assembly 214 to load bus 220, and through meter load connection 222 to socket load connection 228. Meter socket 224 transmits the current to a load, such as to a customer's premises.

In the exemplary embodiment, controller 206 is coupled to display 208, memory 210, power supply module 211, communication module 212, and MEMS switch assembly 214. Controller 206 may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. As used herein, the term "processor" is not limited to only integrated circuits referred to in the art as a processor, but broadly refers to a computer, a microcontroller, a microcomputer, a programmable logic controller, an application specific integrated circuit and any other programmable circuit. Moreover, controller 206 may be a microprocessor that includes read-only memory (ROM) and/or random access memory (RAM).

Display 208 displays information associated with meter 200, including, but not limited to, electricity usage, demand data, and/or status alerts. Display 208 may utilize various display technologies, including, but not limited to, liquid crystal display (LCD), plasma, cathode ray tube (CRT), or analog-type display technologies. In the exemplary embodiment, display 208 includes an LCD.

Memory 210 may include any of a variety of known storage means, including, but not limited to, flash memory, electronically erasable programmable memory, read only memory (ROM), removable media, and/or other volatile and non-volatile storage devices. In the exemplary embodiment, one or more executable instructions are stored in memory 210 for use in controlling an operation of meter 200. Alternatively, the executable instructions may be stored remotely from memory 210, such as at the utility company and/or in a distribution system controller (not shown) located remotely from meter 200.

Power supply module 211 provides power to one or more meter components 203, such as to controller 206, display 208, memory 210, and/or communication module 212, for example. Power supply module 211 receives power from line bus 216 and conditions and/or adjusts a voltage and/or a current to provide power to meter components 203 at suitable levels. Alternatively or additionally, power supply module 211 may receive power from a backup power source, such as a battery (not shown).

Communication module 212 transmits signals to a utility company and/or receives signals (e.g., requests for data) from the utility company. Alternatively, communication module 212 may communicate with an automatic meter reading system, such as, for example, when the automatic meter reading system is selectively activated. In one embodiment, communication module 212 may include one or more optical ports for use in communicating with an external reader, a telephone modem, an RS-232 line, a simple input/output (I/O) board, a complex I/O board, and/or may communicate using any of a plurality of wireless, cellular and/or power line communication carrier technologies.

In the exemplary embodiment, voltage transient suppressor 213 is coupled between the two poles 201 of meter 200. More specifically, voltage transient suppressor 213 is coupled between line bus 216 of each pole 201. Voltage transient suppressor 213 facilitates protecting meter components 203 by suppressing voltage transients within poles 201 that rise above a predefined voltage level.

Controller 206 communicates with (e.g., receives signals from and/or transmits signals to) display 208, memory 210, communication module 212, MEMS switch assembly 214, and/or a variety of other devices located remotely from meter 200. In one embodiment, controller 206 may include and/or may communicate with a real-time clock that keeps time either synchronously or asynchronously with actual time, such as a discrete component time keeping device and/or time keeping software stored in a memory, such as, for example, memory 210.

In the exemplary embodiment, MEMS switch assembly 214 includes a housing 244 that encloses a plurality of MEMS components 215. More specifically, in the exemplary embodiment, MEMS components 215 include, for example, a line transient voltage suppressor 230, a switch voltage conditioning module 231, a MEMS switch array 234, a current sensor 232, and a switch control circuit 240. Alternatively, MEMS switch assembly 214 does not include line transient voltage suppressor 230.

In the exemplary embodiment, line transient voltage suppressor 230 is coupled across MEMS switch array 234, and more specifically, across line bus 216 and load bus 220, to prevent voltage transients from damaging MEMS switch array 234 during switching operations. In the exemplary embodiment, line transient voltage suppressor 230 includes at least one metal oxide varistor. In an alternative embodiment, line transient voltage suppressor 230 includes at least one avalanche diode and/or any other transient voltage suppressor device that enables meter 200 to operate as described herein.

In the exemplary embodiment, switch voltage conditioning module 231 is coupled to line bus 216, and to one or more MEMS components 215, such as to switch control circuit 240. Switch voltage conditioning module 231 receives power from line bus 216 and conditions and/or adjusts a voltage and/or a current to provide power to switch control circuit 240 and/or other MEMS components 215 at suitable levels. Moreover, in the exemplary embodiment, switch voltage conditioning module 231 includes at least one capacitor (not shown) that stores energy received from line bus 216.

In the exemplary embodiment, current sensor 232 is coupled to MEMS switch array 234, to load bus 220, and to controller 206. Current sensor 232 measures an amount of current received from load bus 220 and transmits one or more current measurements to controller 206. In the exemplary embodiment, current sensor 232, includes at least one MEMS-based current sensor. In an alternative embodiment, current sensor 232 includes at least one Hall effect magnetic field sensor, current transformer, Rogowski coil, and/or current shunt that enables meter 200 to function as described herein. In the exemplary embodiment, signals from current sensor 232 are routed through an analog to digital converter (not shown) before reaching controller 206.

Switch control circuit 240 is coupled to MEMS switch array 234, switch voltage conditioning module 231, and controller 206. If switch control circuit 240 receives one or more signals from controller 206 to open and/or close MEMS switch array 234, switch control circuit 240 uses energy stored in the capacitor of switch voltage conditioning module 231 to open and/or close MEMS switch array 234. It will be appreciated that MEMS switches may require substantially less power to operate than conventional mechanical switches. As such, the power requirements of switch control circuit 240 and/or switch voltage conditioning module 231 are facilitated to be reduced, and as such, a size and/or a cost of switch control circuit 240 and/or switch voltage conditioning module 231 is also reduced.

In the exemplary embodiment, line bus 216 is positioned relative to load bus 220 such that an air gap 242 is defined between line bus 216 and load bus 220. Air gap 242 facilitates electrically isolating line bus 216 from load bus 220.

Meter line connection 218 and meter load connection 222 receive and/or transmit alternating current (AC) power from socket line connection 226 and socket load connection 228. In the exemplary embodiment, in accordance with ANSI requirements for a form 2S meter, a total of four stabs are included within meter 200, with two stabs on the line side of meter 200 and two stabs on the load side of meter 200. In FIG. 3, only two stabs, meter line connection 218 and meter load connection 222, are illustrated for clarity. Each ANSI form has a unique configuration of stabs and socket placement, and meter 200 is not limited to any specific configuration. Rather, meter 200 may be used with any ANSI forms and/or configurations.

In the exemplary embodiment, MEMS switch array 234 is coupled to switch control circuit 240, to line bus 216, and to current sensor 232. MEMS switch array 234 controls conduction of current between line bus 216 and load bus 220. Specifically, when MEMS switch array 234 is open, or in an "off" state, current is substantially prevented from flowing from line bus 216 to load bus 220. Conversely, when MEMS switch array 234 is closed, or in an "on" state, current may flow between line bus 216 and load bus 220.

In the exemplary embodiment, MEMS switch array 234 includes a plurality of individual MEMS switches 235. More specifically, in the exemplary embodiment, MEMS switches 235 are positioned in a series-parallel configuration, such that a plurality of MEMS switches 235 are arranged in parallel, and at least one MEMS switch 235 is arranged in series with each parallel MEMS switch 235. As such, MEMS switches 235 may be configured such as described in U.S. Patent Application Publication Number 2007/0139145 to Subramanian et al, for example. In another embodiment, MEMS switches 235 may be arranged in an alternative series-parallel configuration, or in a parallel configuration only, or in a series configuration only. In the exemplary embodiment, when MEMS switch array 234 is opened, all series and parallel MEMS switches 235 are opened. When MEMS switch array 234 is closed, all series and parallel MEMS switches 235 are closed. As such, in the exemplary embodiment, a failure of one MEMS switch 235 may not substantially affect an operation of the remaining MEMS switches 235, or an operation of MEMS switch array 234. In an alternative embodiment, when MEMS switch array 234 is opened, at least one series and/or parallel MEMS switch 235 is opened, and when MEMS switch array 234 is closed, at least one series and/or parallel MEMS switch 235 is closed.

In one embodiment, MEMS switch assembly 214 is configured to switchably conduct 288 volts alternating current (VAC) at 320 amperes (A), single-phase power to a load (not shown) via load bus 220, while conforming to all non-transformer rated single-phase ANSI Form and International Electrotechnical Commission (IEC) Form requirements. In an alternative embodiment, MEMS switch assembly 214 is configured to switchably conduct 660 VAC at 320 A, three-phase power to a load (not shown) via load bus 220, while conforming to all non-transformer rated poly-phase ANSI and IEC Form requirements. Alternatively, MEMS switch assembly 214 and meter 200 may be configured to switchably conduct any suitable voltage and/or current as desired.

During operation, meter 200 is removably coupled to meter socket 224, such as, for example, by using a friction fit, a locking collar, a cable assembly, a bolt assembly, and/or any suitable coupling mechanism to couple meter 200 to meter socket 224. As meter 200 is coupled to meter socket 224, socket line and socket load connections 226 and 228 of meter socket 224 are inserted into meter line and meter load connections 218 and 222, respectively, of lower enclosure 204, and connections 226 and 228 electrically couple to line and load buses 216 and 220, respectively. In the exemplary embodiment, single-phase AC power is transmitted from a utility to meter socket 224, and to line bus 216 via socket line connection 226 and meter line connection 218. If MEMS switch assembly 214 is in an "off" state, substantially no current flows through MEMS switch assembly 214, and load bus 220 is substantially unpowered by MEMS switch assembly 214. Controller 206 may receive a request to turn on electrical service to the load. Such request may be sent to controller 206 via, for example, communication module 212, or via a user input mechanism (not shown) manipulated by a user. Upon receipt of a turn-on request, controller 206 transmits one or more signals to switch control circuit 240 to operate MEMS switch array 234. Switch control circuit 240 transmits one or more signals to MEMS switch array 234 to close MEMS switches 235. Once MEMS switches 235 are closed, current is enabled to flow through MEMS switch array 234, and MEMS switch array 234 is placed in an "on" state. Accordingly, current flows from the utility via line bus 216, through MEMS switch assembly 214, and is output to load bus 220.

As MEMS switch assembly 214 operates, line voltage transient suppressor 230 facilitates suppressing transient voltages and/or transient currents that may occur during the switching operation. Current flows from the line bus 216 through MEMS switch array 234, and through the plurality of MEMS switches 235 to load bus 220. Current sensor 232 measures an amount of current transmitted from the utility to load bus 220, and transmits one or more current measurements to controller 206.

Controller 206 may perform one or more arithmetic operations on the current measurements, and then transmits the measurements to display 208 and/or to memory 210. Display 208 provides a graphical and/or textual representation of the measurements, and memory 210 stores the measurements for later retrieval by controller 206. Alternatively, controller 206 transmits the measurements to communication module 212 for transmitting the measurements to a remote location. Current flows through load bus 220 and socket load connection 228 of meter socket 224, and is delivered to the load.

If the utility or a user desires to turn off MEMS switch assembly 214, a turn-off request is sent to controller 206. In response to the turn-off request, controller 206 transmits one or more signals to switch control circuit 240 to operate MEMS switch array 234. Switch control circuit 240 transmits one or more signals to MEMS switch array 234 to open MEMS switches 235. Once MEMS switches 235 are opened, current is substantially prevented from flowing through MEMS switch array 234, and MEMS switch array 234 is placed in an "off" state. Accordingly, substantially no current flows through MEMS switch assembly 214 to load bus 220, and to the load. In the exemplary embodiment, meter 200 includes two poles 201 with a separate MEMS switch assembly 214 for each pole 201. Switch control circuit 240 may operate both MEMS switch assemblies 214 substantially simultaneously, such that MEMS switch array 234 of the two poles 201 are opened and/or closed substantially at the same time.

Figure 4:
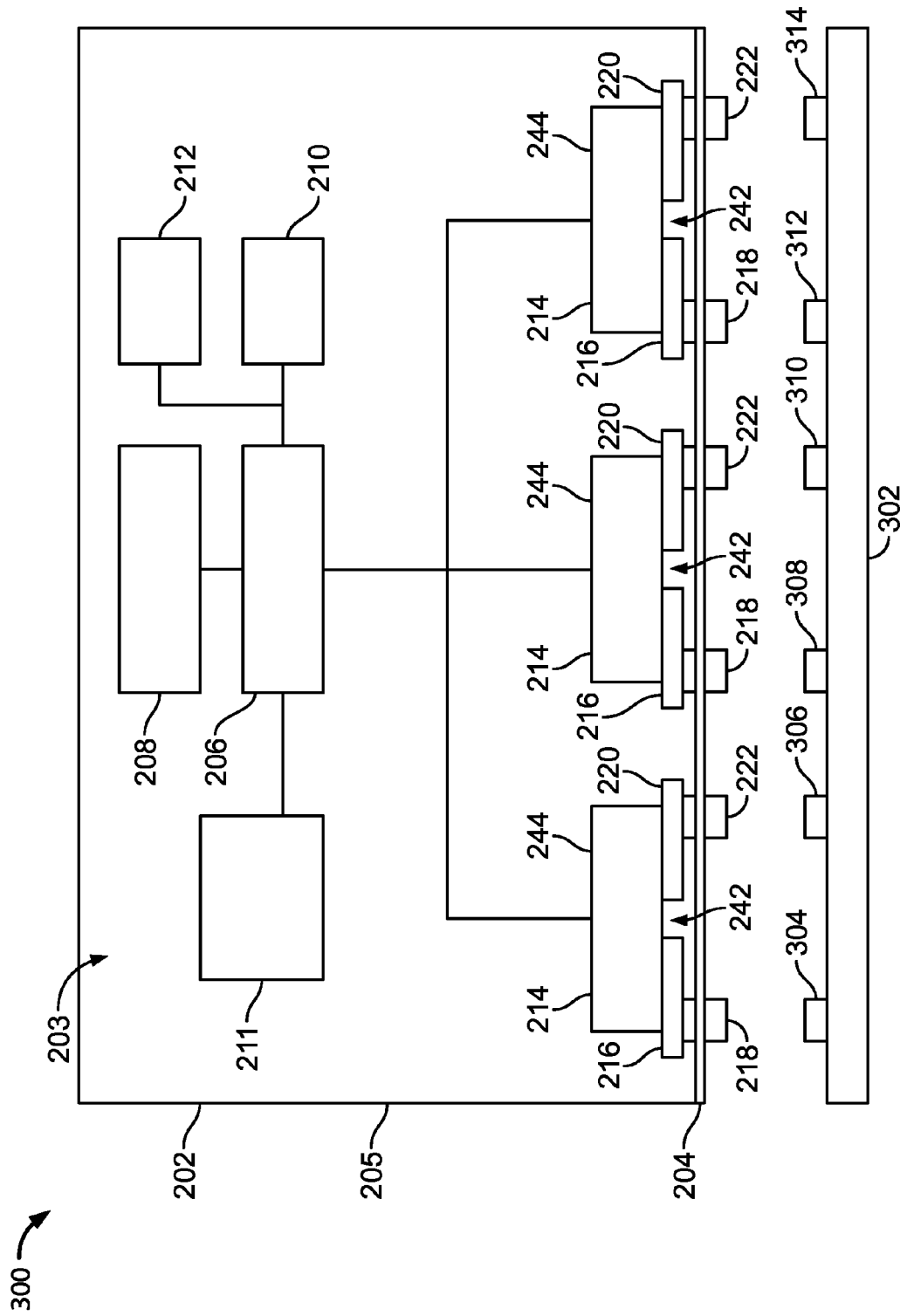
FIG. 4 is a block diagram of an alternative three-phase electricity meter.

FIG. 4 illustrates an alternative three-phase meter 300 that may be used to switchably conduct three-phase AC power delivered via a three-phase meter socket 302. Three-phase meter 300 is similar to meter 200 (shown in FIG. 3) and identical components are identified in FIG. 4 using the same reference numbers used in FIG. 3. Unless otherwise specified, three-phase meter 300 operates substantially similar to meter 200. In the alternative embodiment, three-phase meter 300 includes three MEMS switch assemblies 214, with one MEMS switch assembly 214 switchably coupled to each phase of the three-phase AC power. As such, a meter line connection 218 and a meter load connection 222 of a first MEMS switch assembly 214 are coupled to a first phase socket line connection 304 and a first phase socket load connection 306, respectively. A meter line connection 218 and a meter load connection 222 of a second MEMS switch assembly 214 are coupled to a second phase socket line connection 308 and a second phase socket load connection 310, respectively. A meter line connection 218 and a meter load connection 222 of a third MEMS switch assembly 214 are coupled to a third phase socket line connection 312 and a third phase socket load connection 314, respectively. Alternatively, three-phase meter 300 includes one MEMS switch assembly 214 that includes three MEMS switch arrays 234 (shown in FIG. 3), with one MEMS switch array 234 switchably coupled to each phase of the three-phase AC power. In one embodiment, MEMS switch assembly 214 is configured to switchably conduct 600 VAC at 320 A, three-phase power to a load via load buses 220, while conforming to ANSI Form 16S requirements. Alternatively, MEMS switch assembly 214 is configured to switchably conduct any suitable three-phase voltage, current, and power while conforming to any suitable ANSI form or other requirements.

During operation, three-phase meter 300 receives three-phase power from three-phase meter socket 302. Controller 206 is configured to control a switching operation of the three MEMS switch assemblies 214. More specifically, controller 206 may enable first, second, and/or third MEMS switch assembly 214 to transmit power to a load (not shown). As such, controller 206 directs first, second, and third MEMS switch assembly 214 to close all three phases nearly simultaneously to transmit power substantially uniformly to the load and to avoid an unbalanced load on the distribution system. Alternatively, controller 206 may disable all three MEMS switch assemblies 214 to substantially stop power from being transmitted to the load. In contrast, conventional meters that utilize conventional mechanical switches to switch three-phase power typically require a mechanical interlock system to ensure all three phases would open and close nearly simultaneously. Because MEMS switch assembly 214 has an actuation time of less than one millisecond, such as within microseconds, a mechanical interlock is not needed to ensure substantially simultaneous actuation of all three phases.

Because current sensor 232 is integrated within MEMS switching assembly 214, the opening of MEMS switches 235 can be coordinated with a natural zero crossing of the AC current and therefore a possibility of electrical arcing at the contacts of MEMS switches 235 is facilitated to be reduced or eliminated. Moreover, current sensor 232 can determine a presence of a fault in load bus 220 by detecting a rate of a rise of current beyond a programmable limit. MEMS switching assembly 214 may be configured as described in U.S. Patent Application Publication Number 2008/0137238 to Wright et al, for example, such that asymmetric fault currents may be facilitated to be interrupted with little to no arcing on the contacts of MEMS switches 235. A rapid switching speed of MEMS switches 235 enables MEMS switches 235 and MEMS switch array 234 to interrupt fault currents before the currents damage meter 200 and/or downstream loads. As described herein, MEMS switches 235 can interrupt current flow within 1 millisecond or less after fault detection. In contrast, conventional meters using mechanical circuit breaker technology may be unable to interrupt fault currents. As such, damaging fault currents may flow through meter components for up to 117 milliseconds or more before the current is interrupted by components external to the meter. Because conventional meters must be able to withstand damaging fault currents for such time periods, a cost of components within conventional meters may be high. As such, use of MEMS switches 235 and MEMS switch array 234 may facilitate reducing a cost of components within meter 200.

The above-described embodiments facilitate providing an efficient and cost-effective metering system for measuring electricity usage and remotely connecting or disconnecting electricity service to a load. The MEMS switch assembly may be physically smaller than conventional metering and switching components used within electricity meters. The MEMS switch assembly may use less power than conventional switches, and may not generate as much heat as semiconductor switches. Because the MEMS switch assembly uses less power than conventional switches, the MEMS switch assembly may be remotely operated more efficiently and conveniently than conventional switches. Moreover, use of the MEMS switch assembly facilitates enabling a meter to switchably transmit three-phase power to a load while conforming to the physical constraints of industry standards, such as ANSI and IEC non-transformer rated forms. Accordingly, the utility meter including the MEMS switch assembly described herein facilitates reducing power losses and a heat buildup as compared to known utility meters utilizing solid state switches. In addition, industry standard requirements assume the use of mechanical switches as a disconnect means. Mechanical switches are slow to operate and solid state disconnect switches may be unsuitable for use in interrupting fault current in a similar manner as a circuit breaker. In contrast, the MEMS switches can switch from an on state to an off state and from an off state to an on state in microseconds as compared to tenths of seconds for mechanical switches, and can interrupt fault current substantially without arcing. Because the MEMS switch assembly has a built-in current sensor, the opening of the MEMS switches can be coordinated with the natural zero crossing of the AC current and therefore reduce or eliminate the possibility of arcing. As such, an operational life of the MEMS switch contacts is facilitated to be increased.

Exemplary embodiments of a method and apparatus for switching electrical power are described above in detail. The method and apparatus are not limited to the specific embodiments described herein, but rather, components of the apparatus and/or steps of the method may be utilized independently and separately from other components and/or steps described herein. For example, the MEMS switch assembly may also be used in combination with other utility measuring and switching systems and methods, and is not limited to practice with only the electricity meter as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A current control device, comprising:
    a housing comprising an upper enclosure and a lower enclosure;
    at least one line socket configured to couple to a first power system;
    at least one load socket configured to couple to a second power system;
    at least one current measuring device, said at least one current measuring device is enclosed within said housing, wherein said at least one current measuring device is configured to measure an amount of current transmitted from said at least one load socket, and wherein said at least one current measuring device comprises at least one micro-electromechanical system (MEMS) current sensor;
    at least one micro-electromechanical system (MEMS) switching device coupled between said at least one line socket and said at least one load socket, said at least one MEMS switching device configured to selectably couple the first power system to the second power system, said at least one MEMS switching device comprising a line transient voltage suppressor that is coupled across said at least one MEMS switching device, said at least one MEMS switching device enclosed within said housing;
    a switch voltage conditioning module coupled to said at least one MEMS switching device, wherein said switch voltage conditioning module is configured to provide power to MEMS components and is enclosed within said housing;
    a communication module; and
    a controller in communication with said at least one MEMS switching device, said at least one current measuring device, and said communication module, wherein said controller receives a signal representing the measured amount of current from said at least one current measuring device via an analog-to-digital converter.

2. A current control device in accordance with claim 1, wherein said current control device is configured to receive three-phase power from the first power system and to transmit three-phase power to the second power system.

3. A current control device in accordance with claim 2, wherein said current control device comprises at least three MEMS switching devices, at least one MEMS switching device coupled to each phase of the three-phase power.

4. A current control device in accordance with claim 1, wherein said current control device is configured to interrupt a fault current within less than about 1 millisecond after a fault is detected.

5. A current control device in accordance with claim 1, wherein said current control device further comprises a plurality of MEMS switching devices coupled together in a series-parallel configuration.

6. A utility meter comprising:
    a line electrical bus configured to couple to a first power system;
    a load electrical bus configured to couple to a second power system; and
    a current control device comprising:
        a housing comprising an upper enclosure and;
        at least one current measuring device, said at least one current measuring device is enclosed within said housing, wherein said at least one current measuring device is configured to measure an amount of current transmitted from said at least one load socket, wherein said at least one current measuring device comprises at least one micro-electromechanical system (MEMS) current sensor, and wherein said at least one current measuring device is configured to detect that the measured amount of current exceeds a predetermined limit;
        at least one line socket configured to couple to said line electrical bus;

at least one load socket configured to couple to said load electrical bus;

at least one micro-electromechanical system (MEMS) switching device coupled between said at least one line socket and said at least one load socket, said at least one MEMS switching device configured to selectably couple the first power system to the second power system, said at least one MEMS switching device comprising a line transient voltage suppressor that is coupled across said at least one MEMS switching device, said at least one MEMS switching device;

a switch voltage conditioning module coupled to said at least one MEMS switching device, wherein said switch voltage conditioning module is configured to provide power to MEMS components and is enclosed within said housing;

a communication module; and a controller in communication with said at least one MEMS switching device, said at least one current measuring device, and said communication module, wherein said controller receives a signal representing the measured amount of current from said at least one current measuring device via an analog-to-digital converter.

7. A utility meter in accordance with claim 6, wherein said current control device is configured to receive three-phase power from the first power system and to transmit three-phase power to the second power system.

8. A utility meter in accordance with claim 7, wherein said current control device comprises at least three MEMS switching devices, at least one MEMS switching device coupled to each phase of the three-phase power.

9. A utility meter in accordance with claim 6, wherein said communication module is configured to enable the first power system to remotely operate said current control device.

10. A utility meter in accordance with claim 6, wherein said current control device is configured to interrupt a fault current within less than about 1 millisecond after a fault is detected.

11. A current control device for use in a utility meter, wherein said utility meter comprises an upper enclosure and a lower enclosure forming a housing, said utility meter contained within said current control device, said current control device enclosed within said housing, said current control device comprising:

at least one line socket configured to couple to an electric utility power distribution system;

at least one load socket configured to couple to a customer power distribution system;

at least one current measuring device, said at least one current measuring device is enclosed within said housing, wherein said at least one current measuring device is configured to measure an amount of current transmitted from said at least one load socket, wherein said at least one current measuring device comprises at least one micro-electromechanical system (MEMS) current sensor;

at least one micro-electromechanical system (MEMS) switching device coupled between said at least one line socket and said at least one load socket, said at least one MEMS switching device configured to selectably couple the electric utility power distribution system to the customer power distribution system, said at least one MEMS switching device comprising a line transient voltage suppressor that is coupled across said at least one MEMS switching device;

a switch voltage conditioning module coupled to said at least one MEMS switching device, wherein said switch voltage conditioning module is configured to provide power to MEMS components;

a communication module; and a controller in communication with said at least one MEMS switching device, said at least one current measuring device, and said communication module, wherein said controller receives a signal representing the measured amount of current from said at least one current measuring device via an analog-to-digital converter.

12. A current control device in accordance with claim 11, wherein said current control device is configured to receive three-phase power from the electric utility power distribution system and to transmit three-phase power to the customer power distribution system.

13. A current control device in accordance with claim 12, wherein said current control device comprises at least three MEMS switching devices, at least one MEMS switching device coupled to each phase of the three-phase power.

14. A current control device in accordance with claim 11, wherein said current control device is configured to interrupt a fault current within less than about 1 millisecond after a fault is detected.

15. A current control device in accordance with claim 1, wherein said at least one current measuring device is configured to detect that the measured amount of current exceeds a predetermined limit programmed at said controller.

16. A utility meter in accordance with claim 7, wherein said at least one current measuring device is configured to detect that the measured amount of current exceeds a predetermined limit programmed at said controller.

17. A current control device in accordance with claim 11, wherein said at least one current measuring device is configured to detect that the measured amount of current exceeds a predetermined limit programmed at said controller.

18. A current control device in accordance with claim 2, wherein said controller is configured to close all three phases of the three-phase power simultaneously to transmit power substantially uniformly to the load and to avoid an unbalanced load on the distribution system.

\* \* \* \* \*